United States Patent
Ahuja et al.

(10) Patent No.: US 10,911,493 B2
(45) Date of Patent: Feb. 2, 2021

(54) IDENTIFYING COMMUNICATION PATHS BETWEEN SERVERS FOR SECURING NETWORK COMMUNICATIONS

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US); Meni Hillel, San Jose, CA (US)

(73) Assignee: SHIELDX NETWORKS, INC., San Jose, CA (US)

( * ) Notice: Subject to any disclaimer, the term of this patent is extended or adjusted under 35 U.S.C. 154(b) by 175 days.

(21) Appl. No.: 15/921,446

(22) Filed: Mar. 14, 2018

(65) Prior Publication Data
US 2019/0289035 A1 Sep. 19, 2019

(51) Int. Cl.
*H04L 29/06* (2006.01)
*H04L 12/26* (2006.01)

(52) U.S. Cl.
CPC .............. *H04L 63/20* (2013.01); *H04L 43/08* (2013.01); *H04L 63/1425* (2013.01); *H04L 43/062* (2013.01); *H04L 43/0829* (2013.01)

(58) Field of Classification Search
CPC ..... H04L 63/20; H04L 63/1425; H04L 43/08; H04L 43/062; H04L 43/0829
See application file for complete search history.

(56) References Cited

U.S. PATENT DOCUMENTS

| | | | |
|---|---|---|---|
| 9,716,617 B1* | 7/2017 | Ahuja | H04L 63/20 |
| 10,013,550 B1* | 7/2018 | Ahuja | G06F 21/55 |
| 10,148,504 B2* | 12/2018 | Ahuja | H04L 63/0227 |
| 10,250,673 B1* | 4/2019 | Brooker | H04L 67/10 |
| 10,452,466 B1* | 10/2019 | Mitchell | G06F 11/302 |
| 2003/0023711 A1* | 1/2003 | Parmar | H04L 41/0893 709/223 |
| 2006/0048142 A1* | 3/2006 | Roese | H04L 41/0893 717/176 |
| 2007/0016950 A1* | 1/2007 | Okamura | H04L 63/1433 726/22 |
| 2009/0271607 A1* | 10/2009 | Karve | G06F 9/5011 713/100 |

(Continued)

*Primary Examiner* — Sarah Su
(74) *Attorney, Agent, or Firm* — Nicholson De Vos Webster & Elliott LLP

(57) ABSTRACT

Systems, methods, and apparatuses enable a microservice to identify server-to-server communication paths between servers in a networked environment. The system identifies a server connected to a security microservice managed by a management microservice. The system deploys a security policy on the identified server, and identifies the server-to-server communication paths between the identified server and one or more of a plurality of servers. The system identifies the active communication paths from the identified server to one or more of a plurality of servers, or a subset of communication paths determined based on search criteria. When the system identifies servers of the one or more of the plurality of servers without an existing security policy, the system processes the identified server. In one embodiment, processing the identified servers includes applying a security policy to the identified servers.

15 Claims, 12 Drawing Sheets

(56) References Cited

U.S. PATENT DOCUMENTS

| | | | |
|---|---|---|---|
| 2009/0293100 A1* | 11/2009 | Kang | G06F 21/57 |
| | | | 726/1 |
| 2009/0296128 A1* | 12/2009 | Hasegawa | G06F 3/1204 |
| | | | 358/1.14 |
| 2010/0106962 A1* | 4/2010 | Chen | H04L 63/065 |
| | | | 713/153 |
| 2011/0231900 A1* | 9/2011 | Shimoe | G06F 21/604 |
| | | | 726/1 |
| 2013/0246593 A1* | 9/2013 | Bryskin | H04L 45/02 |
| | | | 709/223 |
| 2015/0128213 A1* | 5/2015 | Steed | H04L 51/12 |
| | | | 726/1 |
| 2018/0034832 A1* | 2/2018 | Ahuja | H04L 63/1408 |
| 2018/0034833 A1* | 2/2018 | Ahuja | H04L 63/1408 |
| 2018/0034839 A1* | 2/2018 | Ahuja | H04L 41/0668 |
| 2018/0103064 A1* | 4/2018 | Ahuja | H04L 63/20 |
| 2018/0121221 A1* | 5/2018 | Ahuja | G06F 9/45558 |
| 2018/0343281 A1* | 11/2018 | Ahuja | H04L 63/1425 |
| 2019/0190954 A1* | 6/2019 | Fu | G06F 21/577 |

* cited by examiner

IDENTIFYING COMMUNICATION PATHS BETWEEN SERVERS FOR SECURING NETWORK COMMUNICATIONS

TECHNICAL FIELD

Embodiments described herein generally relate to network security. Embodiments described herein generally relate to systems and methods for determining active connections between servers in a network environment.

BACKGROUND INFORMATION

Most businesses and organizations rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
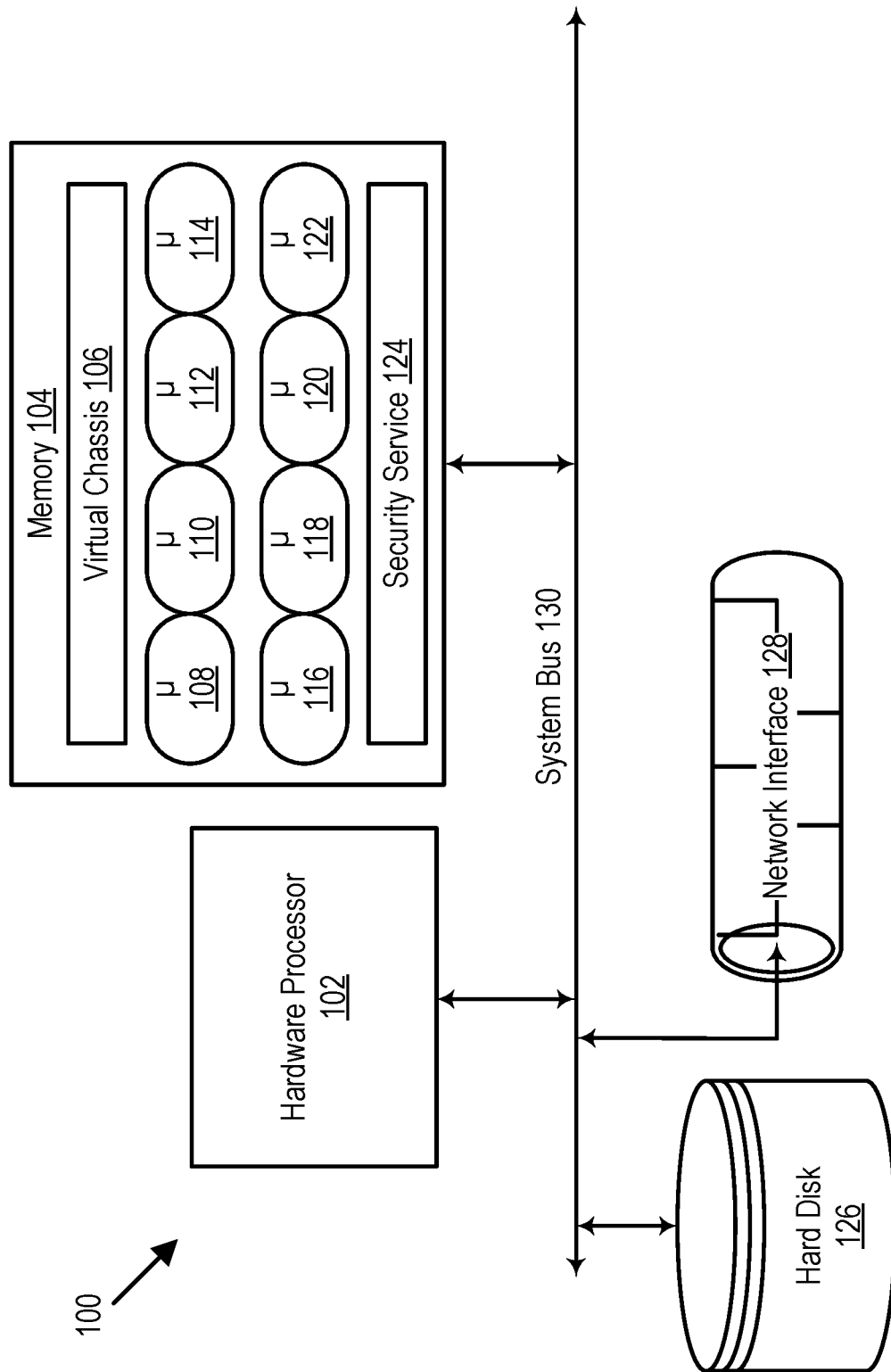
FIG. 1 is a block diagram of a network security system illustrating computer hardware, including a memory and processor, in accordance with the disclosed embodiments.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In order to monitor network traffic for potentially bad or malicious network traffic, a security system utilizing a plurality of security microservices can be implemented. In typical systems, the security system can spawn or initialize components (e.g., security microservices) that perform security analyses of the network traffic. However, deficiencies of existing security solutions become apparent from the typical structure of security microservices. For example, some existing security solutions require a security service to install security policies for all possible connections between a plurality of servers. However, given a system with n servers having n! connections, applying a security policy to each connection would require n! security policies. As the number of servers in the system increases, the number of connection and, correspondingly, the number of security policies increases significantly. Large systems would require significant amounts of time to identify all possible connections and significant amounts of storage space to store the security policies.

To address the deficiencies of existing security infrastructures, embodiments detailed herein use a management microservice to efficiently determine active connections, or a subset of active connections between servers in a networked environment. To that end, the management microservice recursively identifies the servers in the network environment, identifies server-to-server communication paths, and applies security policies to identified paths. In some embodiments, the management microservice defines criteria for identifying server-to-server communications paths. In one example, the management microservice establishes criteria to identify communication paths handling particular types of data, amounts of data, etc. In another example, the management microservice establishes criteria to identify encrypted communications or communication paths transmitting encrypted data. In contrast to systems that identify and apply security policies to all possible communication paths, identifying only specific communication paths (e.g., all active or criteria matching paths) and applying security policies to only those specific communication paths reduces the amount of computing resources required to analyze a network environment and protect the network environment from malicious traffic.

For example, some embodiments detailed herein utilize a management microservice to identify a server connected to a security microservice managed by the management microservice. The management microservice deploys a security policy on the identified server, and identifies the server-to-server communication paths between the identified server and one or more of a plurality of servers. For example, the management microservice identifies the active communication paths from the identified server to one or more of a plurality of servers. When the management microservice identifies servers of the one or more of the plurality of servers without an existing security policy, the management microservice processes the identified server. In one embodiment, processing the identified servers includes applying a security policy to the identified servers.

FIG. 1 is a block diagram of network security system 100 illustrating computer hardware, including a memory (e.g., 104) and processor (e.g., 102), in accordance with the disclosed embodiments. Block diagram 100 further includes a hard disk (e.g., 126) and network interface 128. In one embodiment, hardware processor, memory 104, hard disk 126, and network interface 128 are coupled to each other via a system bus (e.g., 130). Network security microservices 108-122 are stored in memory 104 (e.g., volatile memory such as Random Access Memory (RAM) and/or non-volatile memory such as disk) and executed by one or more hardware processors or processor cores 102. Network security microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, network security system 100 utilizes hardware processor 102 (such as a central processing unit (CPU) or one or more cores thereof, a graphics processing unit (GPU) or one or more cores thereof, or an accelerated processing unit (APU) or one or more cores thereof) to execute microservices and other applications (e.g., virtual chassis 106, security service 124, etc.) stored in memory 104. Network interface 128 (e.g., fabric or interconnect that is wired or wireless) provides a means for communicating with a data center. Network security system 100 may inspect traffic, detect threats, generate security policies (e.g., access control lists), and otherwise protects a data center using the microservices 108-122.

Embodiments of network security system 100 providing the above capabilities are now discussed in more detail. Network security system 100 adds security to, or enhances the security of, a datacenter or other computing environment. In one embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, network security system 100 utilizes a network interface 128 to explore the datacenter and to discover existing network segments, determine security settings to apply to various network segments, detect available hosts and hardware resources, and determine additional configuration information as needed. In one embodiment, the datacenter itself includes several machines with hypervisors, or physical hardware, and the network security system 100 offers microservices to communicate with and protect one or more of those internal virtual machines or physical hardware. Based on performing datacenter discovery, network security system 100, in some embodiments, may then offer or suggest available security tools for selection either through a graphical interface or via connections with existing enterprise management software. In one embodiment, once configured, network security system 100 is deployed "in-line," receiving packets headed for the datacenter, thereby allowing network security system to intercept and block suspicious traffic before it reaches the datacenter. With an understanding of the datacenter, network security system 100 deploys microservices to inspect traffic throughout the datacenter, and not only at ingress. In some embodiments, network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which may also be a microservice. In one embodiment, the microservices are small in size, consisting of a relatively small number of instructions. In one embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

Memory 104 also stores security service 124. Security service 124 is configured to utilize a plurality of microservices to manage the initialization of other security microservices on a computing device (e.g., servers) to prevent potentially bad or malicious network traffic from being transmitted from an untrusted network (e.g., the internet) to trusted network resources, and between trusted network resources. In one embodiment, security service 124 prevents or reduces the risk of malicious network traffic from accessing trusted network resources and from being communicated between trusted network resources by identifying all or a subset of communication paths and deploying security policies on the servers on the identified communication paths. In one embodiment, the embodiments disclosed herein are performed by security service 124. In other embodiments, the embodiments disclosed herein are performed by microservices (e.g., microservices 108-122) based on instructions from security service 124.

It will be understood by those of ordinary skill in the art that a datacenter typically employs many instances of the hardware represented within network security system 100 such as hardware processor 102 and memory 104. Individual servers may have multiple processors or multiple processing boards each with multiple processors. Processors may have a plurality of processing cores and access a plurality of network interfaces. Security service 124 comprises program code executing within a processor and may have interfaces (such as configuration or administration user interfaces) that are made available over a network to users. In a virtualized environment, the user may not be aware of the specific processor on which security service 124 is executing and, in some embodiments, that processor may change based on loading of the virtual environment. Such changes may occur based on administrator requests or automatically based on the virtual environment's control software.

In one embodiment, network security system 100 receives traffic via network interface 128 to/from a datacenter. In one embodiment, network security system 100 is placed in-line to inspect traffic, and potentially intercept a threat before it arrives at, or leaves, the datacenter. In other embodiments, network security system 100 monitors the traffic heading into, or out of, the datacenter, in which case network security system 100 detects threats and generates alerts, but does not block the data. Hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In one embodiment, microservices 108-122 are implemented using computer-executable instructions loaded from the Internet via network interface 128. For instance, in one embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer-readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, network security system 100 runs on a datacenter computer. In other embodiments, however, network security system 100 is installed and runs on any one of a wide variety of computing platforms, ranging from low-cost to high-cost, and from low-power to high power. In some embodiments, network security system 100 runs on a server. In some embodiments, network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
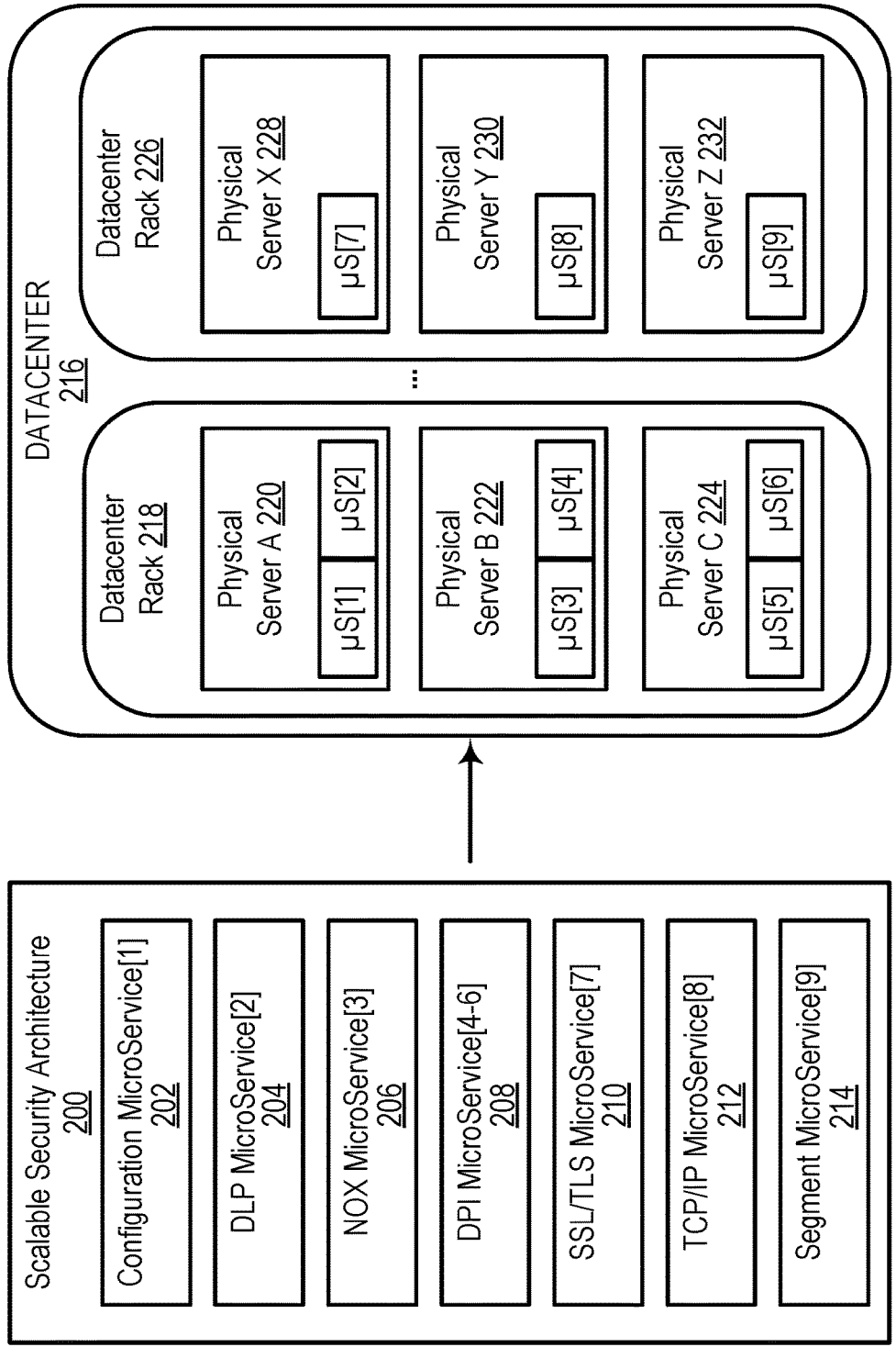
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each level of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3X, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
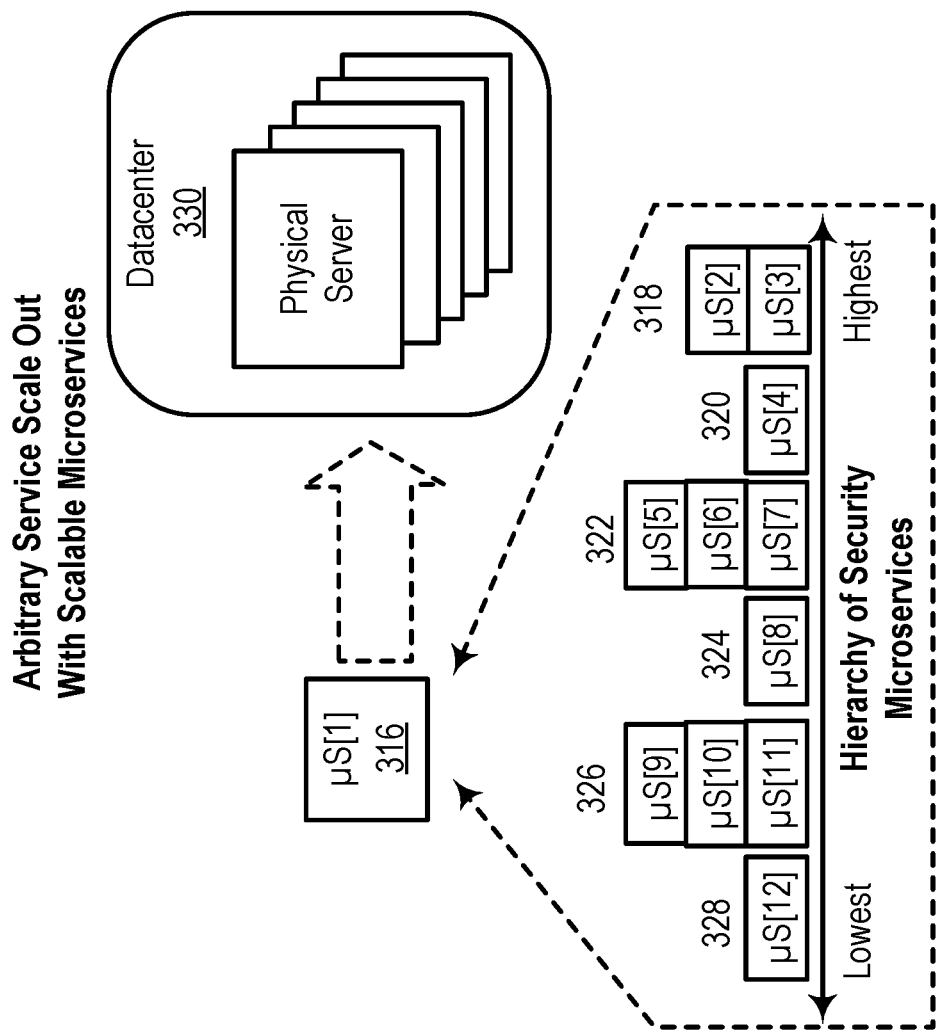
FIG. 3 illustrates an arbitrary scaling out of a microservice in accordance with the disclosed embodiments.
Figure 3:
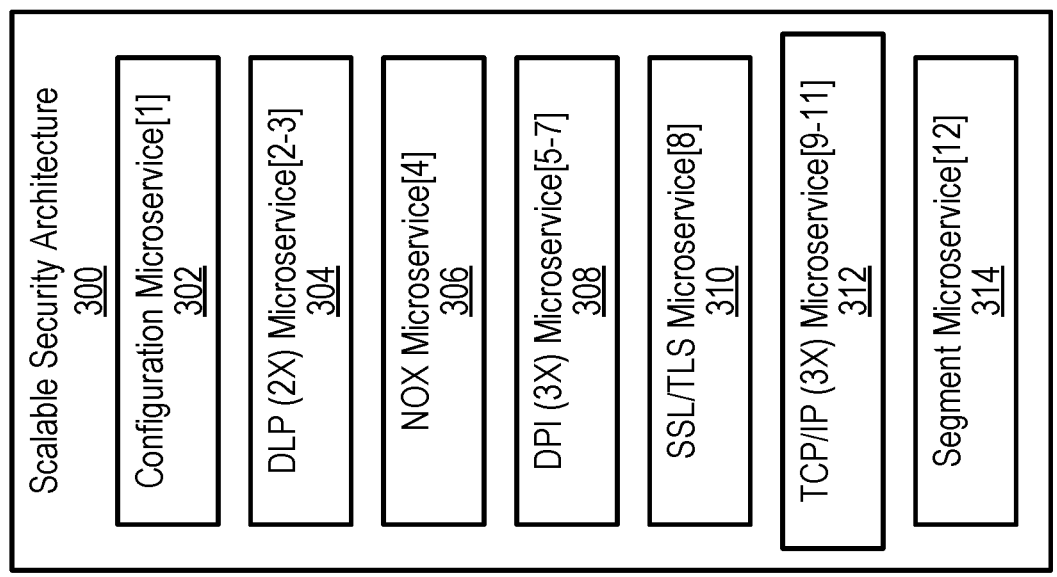

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy, and configures them to communicate with each other via a backplane. The microservices, for example, may be implemented by physical servers in datacenter 330.

Figure 4:
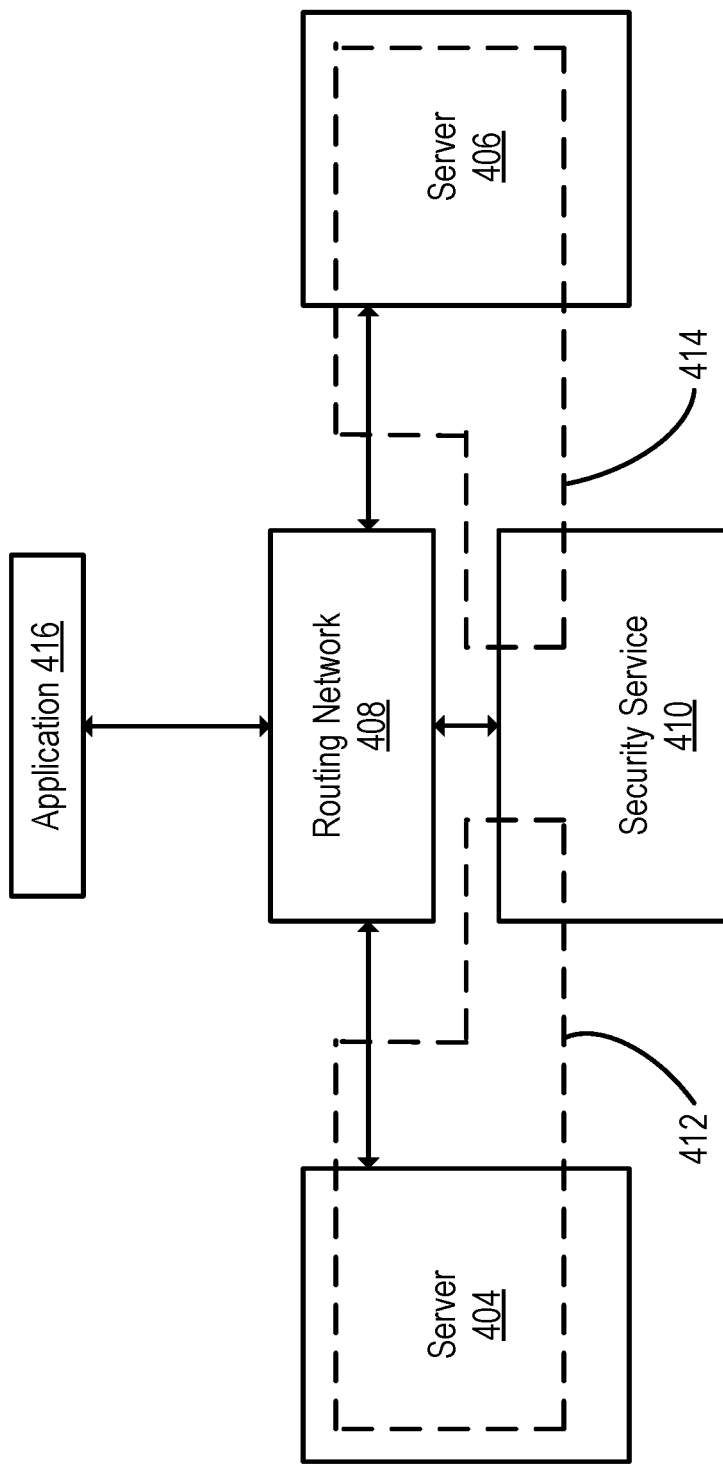
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between an application 416 and one or more servers 404, 406 through a routing network 408. In one embodiment, security service 410 is an example of security service 124 in FIG. 1. In one embodiment, security service 410 comprises one or more "microservices" (e.g., microservices 108-122 in FIG. 1) used to monitor and perform various actions relative to data items (e.g. network traffic, files, email messages, etc.) sent to and received from one or more applications 416 and servers 404, 406. The microservices comprising security service 410 do not need to be confined to one physical server such as a server 404, 406. For example, one or more microservices of the security service 410 may be executed on server 404 and other microservices of the security service 410 are executed on 406. In some embodiments, the security service 410 is executed on a different server from one or more servers for which the security service is responsible for monitoring and protecting. In one embodiment, servers 404, 406, security service 410, and application 416 are deployed in a networked environment. Examples of networked environments include data centers, an on-premise stack, and a set of servers remotely connected using a network.

In one embodiment, a routing network 408 provides connectivity among servers 404, 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
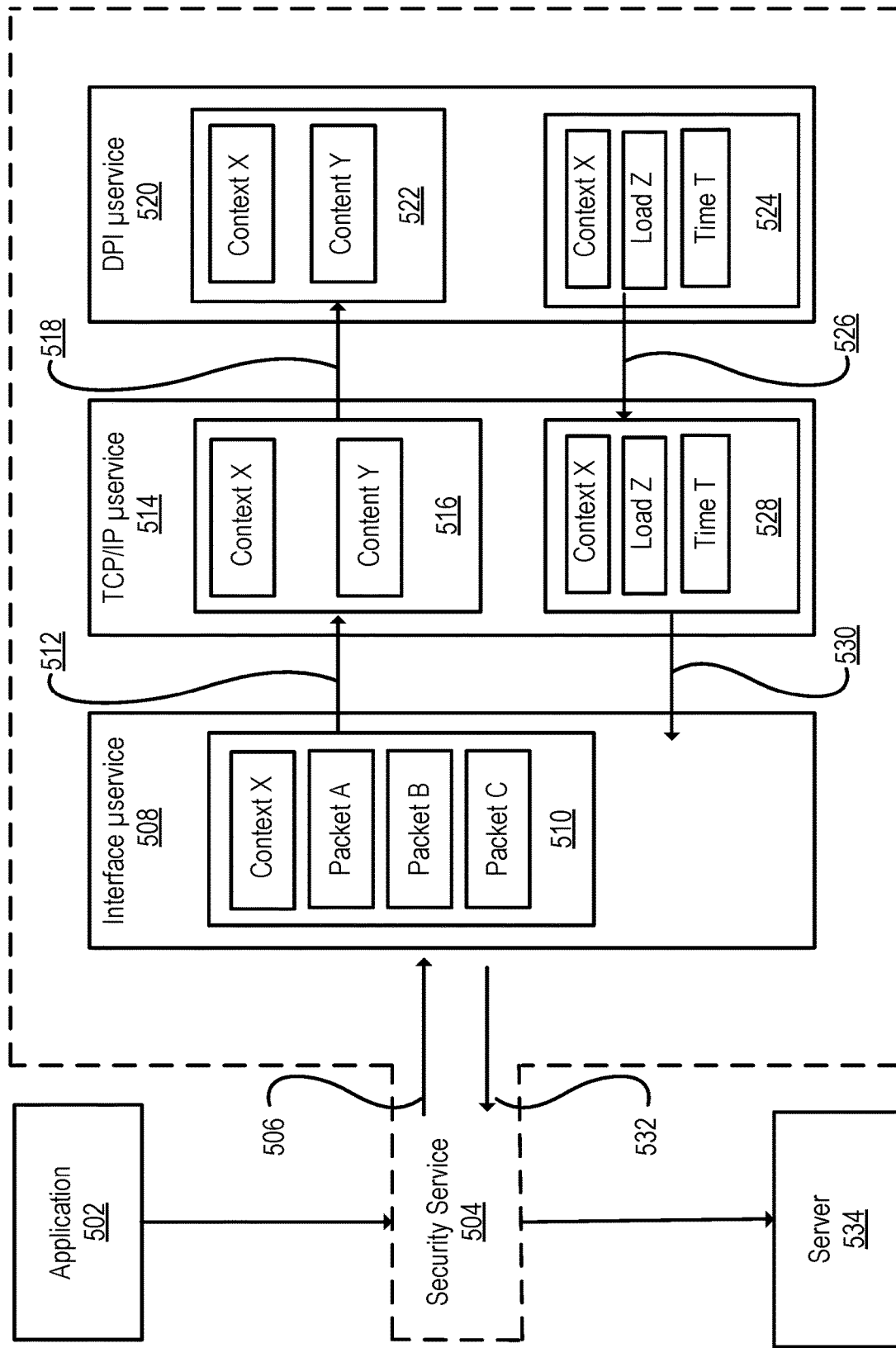
FIG. 5 is a block flow diagram illustrating application data traversing to a server after passing through a hierarchy of security microservices in accordance with the disclosed embodiments.

FIG. 5 is a block flow diagram illustrating application data traversing to a server after passing through a hierarchy of security microservices according to an embodiment. As illustrated, the flow begins with security service 504 receiving a network data packet from application 502. In one embodiment, security service 504 is an example of security service 124 in FIG. 1. Security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service), or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via paths 526 and 530, the microservices receive and can maintain real-time loading and processing latency information utilized to make load balancing decisions.

Figure 6:
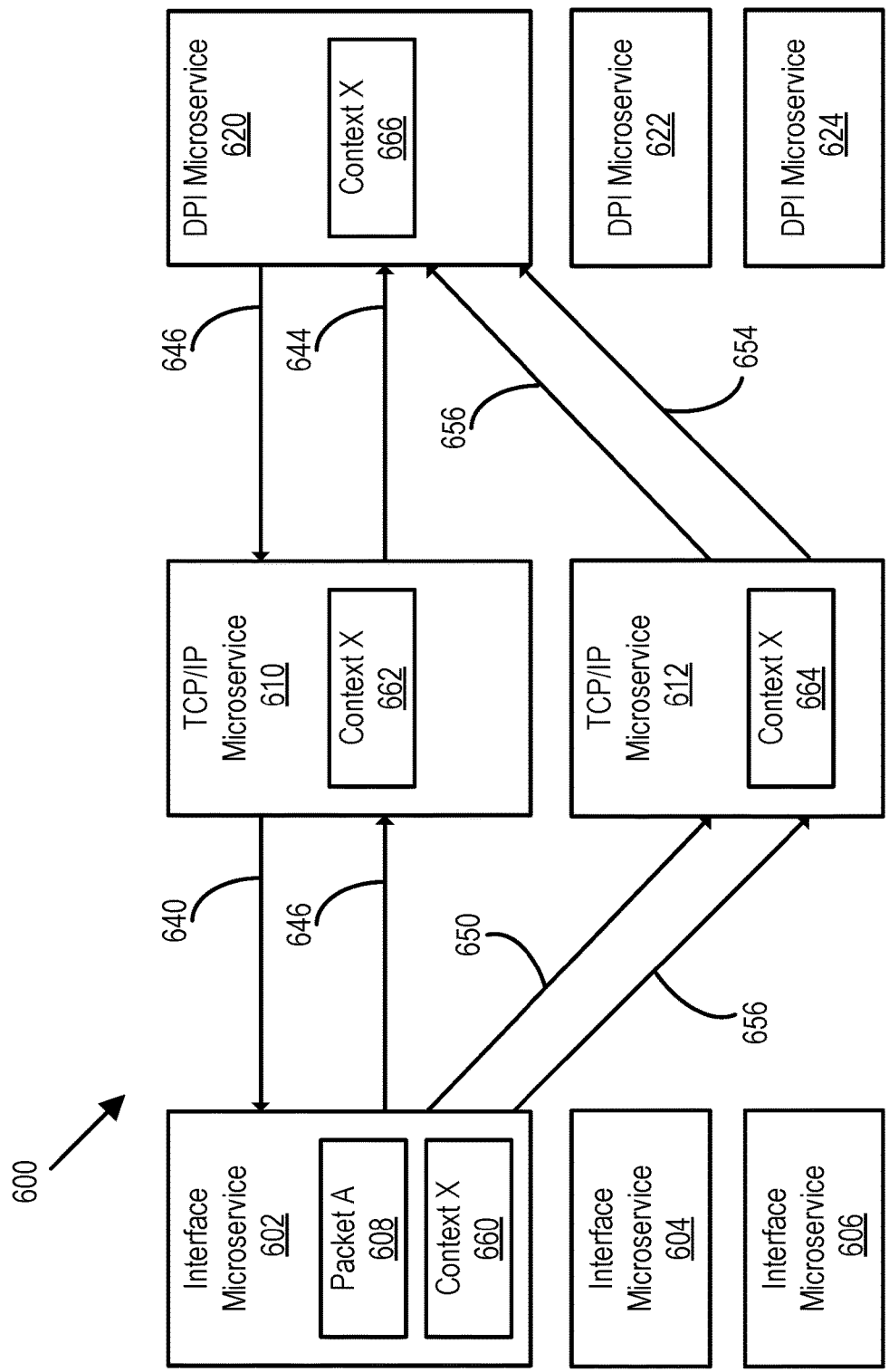
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices and/or a different number of microservice types. In one embodiment, security service 600 is an example of security service 124 in FIG. 1. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission 646. Context X 662, when transmitted to DPI microservice 620 as part of transmission 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and also a state lookup or a context lookup, in addition to other information. Interface microservice 602 provides packet A 608 and context X 660 to TCP/IP microservice 610 or 612 via path 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data and/or the data resulting from the security processing to DPI microservice 620 via paths 644 or 656, respectively. Along with the transmitted data, TCP/IP microservice 610 or 612 forwards context X 662 or 664, respectively, to a DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via path 650. TCP/IP microservice 612 performs some security processing, then transmits the second packet and context X 664 to DPI microservice 620 via path 654. After performing some security processing, DPI microservice 620 responds to TCP/IP microservice 612 via path 654, and TCP/IP microservice responds to interface microservice 602 via path 656.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

Figure 7:
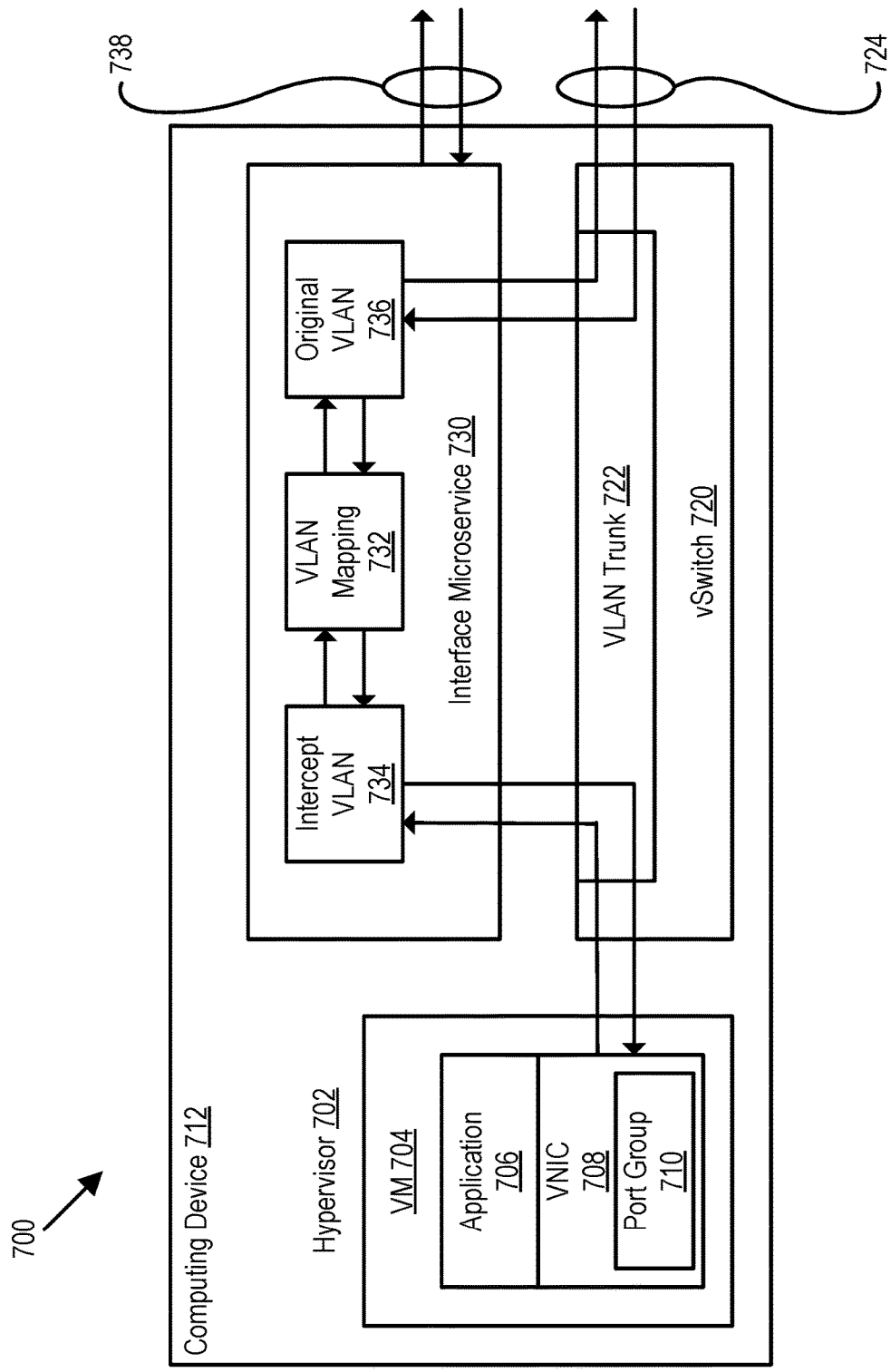
FIG. 7 is a block diagram illustrating an example interface microservice configured to intercept network traffic routed by a vSwitch in accordance with the disclosed embodiments.

FIG. 7 is a block diagram illustrating an example interface microservice configured to intercept network traffic routed by a vSwitch in accordance with the disclosed embodiments. In one embodiment, computing device 712 includes hypervisor 702, vSwitch 720, and interface microservice 730. Hypervisor 702 is a component implemented in software, hardware, firmware, or combinations thereof, and which manages the creation and operation of one or more virtual machines (VMs) (e.g., VM 704). Examples of hypervisor 702 include, but are not limited to, a VMware® ESX™/ESXi™ hypervisor, a Citrix® XenServer® hypervisor, or a Microsoft® Hyper-V® hypervisor. In some embodiments, vSwitch 720 and port groups 722 are integrated into or otherwise part of hypervisor 702, configured via hypervisor 702, or some combination thereof.

In one embodiment, VM 704 running on hypervisor 702 is generally any type of emulated computer system that can share hardware resources with one or more other VMs running on hypervisor 702. In the example of FIG. 7, VM 704 includes at least one application 706 and at least one virtual network interface card (VNIC) 708. Examples of application 706 include, but are not limited to, an operating system, a system application, and a user application. FIG. 7 represents an example embodiment that is provided for purposes of illustrating a clear example; other embodiments may use different arrangements.

In FIG. 7, interface microservice 730 is deployed on computing device 712 to intercept network traffic routed by vSwitch 720 (e.g., network traffic sent and received by VM 704 via VNIC 708). When VNIC 708 sends a network packet (e.g., based on a request generated by application 706 or another source), VM 704 includes an identifier associated with port group 710 with the network packet. In embodiments where interface microservice 730 is not present in FIG. 7, the network packets including a port group identifier arrive at vSwitch 720, vSwitch 720 determines a VLAN to which port group 710 is assigned, and sends the network packet out network path 724 based on the determined VLAN. At a high level, a port group is a vSwitch configuration which defines a logical grouping of VNICs connected to the ports comprising the group. For example, system 700 might include any number of VMs 704 having any number of VNICs 708, and the VNICs can be grouped into any number of port groups by the vSwitch 720. A port group can be further associated with configuration options applied to the member ports including, for example, bandwidth limitations, traffic shaping rules, and other settings.

In the embodiment of FIG. 7, a VLAN assigned to port group 710 as in the example above is referred to as an "original" or "existing" VLAN. In one embodiment, to enable interface microservice 730 to intercept network traffic routed by vSwitch 720, interface microservice 730 (or another configuration microservice) creates a new VLAN, referred to herein as an "intercept" VLAN, for each original VLAN and further generates and stores VLAN mapping 732 indicating a mapping from each original VLAN to a respective intercept VLAN. Interface microservice 730 further adds the original VLAN and the intercept VLAN to VLAN trunk 722 enabling the traffic on both VLANs to be routed to an interface microservice 730.

In one embodiment, based on the configuration described above, interface microservice 730 can change the VLAN assigned to port group 710 of VM 704 from the original VLAN to the intercept VLAN and, consequently, packets sent from VM 704 are directed to interface microservice 730 via the VLAN trunk 722. The interface microservice 730 can then translate the intercept VLAN 734 to the original VLAN 736 using the VLAN mapping 732, and network traffic leaving network path 724 can be associated with the original VLAN.

Similarly, when a network packet is received by vSwitch 720 coming in from network path 724, because interface microservice 730 is now part of VLAN trunk 722 for both the intercept VLAN and the original VLAN and the incoming network packets are associated with the original VLAN, the network packets are routed to interface microservice 730. Interface microservice 730 similarly maps the original VLAN to the intercept VLAN using VLAN mapping 732, and the packets are sent to VM 704 using VLAN trunk 722. In this manner, the changes to the network structure at hypervisor 702 and vSwitch 720 are transparent to outside devices which only are aware of the original VLAN.

In one embodiment, interface microservice 730 determines whether a network packet (or multiple network packets) require further inspection (e.g., via a security microservice) prior to allowing the network packet to proceed to its destination. In one embodiment, when a network packet requires inspection, interface microservice 730 transmits the network packet on network path 738 to another computing device for processing by a security microservice. In other embodiments, when a network packet requires inspection, the network packet is not transmitted and a local security microservice performs the inspection. In one embodiment, interface microservice 730 prevents the network packet from being transmitted to the intended destination of the network packet prior to completion of the inspection. In other embodiments, interface microservice 730 performs the inspection concurrently with transmitting the network packet to the intended destination. In such embodiments, interface microservice 730 generates a copy of the network packet to perform the inspection.

Figure 8:
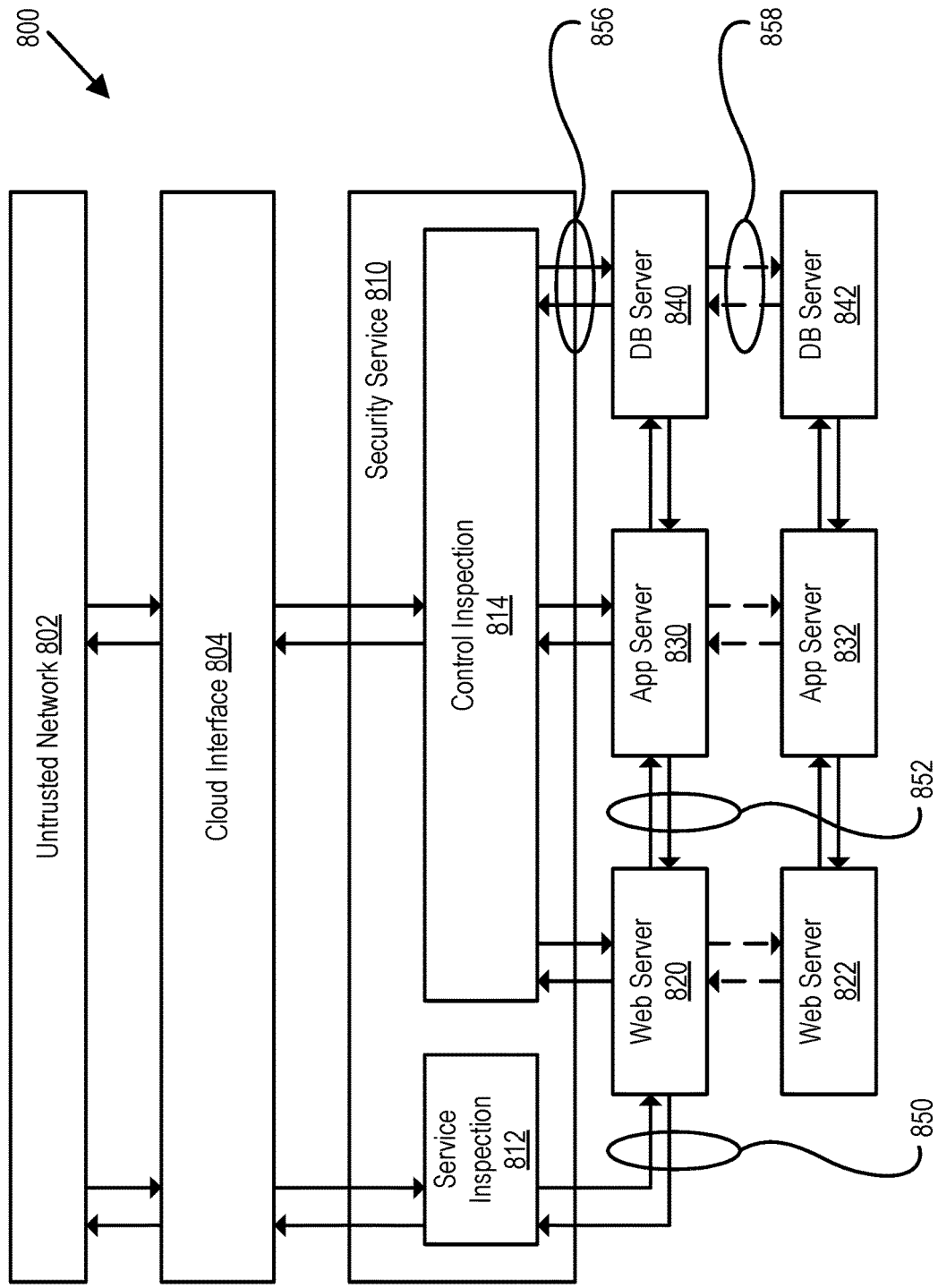
FIG. 8 is a block diagram illustrating an example system including a security service configured to intercept network traffic from a network (e.g. the internet) in accordance with the disclosed embodiments.

FIG. 8 is a block diagram illustrating an example system 800 including security service 810 configured to intercept network traffic from a network in accordance with the disclosed embodiments. In FIG. 8, security service 810 is connected to untrusted network 802 via a connection with cloud interface 804. In one embodiment, untrusted network 802 is the internet. In one embodiment, security service 810 is an example of security service 124 in FIG. 1. In one embodiment, cloud interface 804 is a boundary between untrusted network 802 and internal servers (e.g., web servers 820 and 822, application servers 830 and 832, and database (DB) server 840 and 842). In some embodiments, security service 810 also operates as a firewall protecting the internal servers from external threats from untrusted network 802. In one embodiment, security service 810 inspects network traffic received by cloud interface 804 prior to the network traffic being transmitted to servers 820-842, such as the network traffic transmitted on network connections 850 and 856.

In FIG. 8, security service 810 includes service inspection 812 and control inspection 814. In one embodiment, service inspection 812 provides security services for all or portions of the data plane of the virtual network environment of the web servers, app servers and DB servers. Data plane communication consists of that communication resulting from providing security services to the users of the web servers or other servers. In one embodiment, service inspection 812 is configured to communicate with web servers (e.g., 820, 822). For example, service inspection 812 acts as a firewall for network traffic associated with a service prior to the network traffic reaching the internal servers (e.g., 820-842). Network traffic received by service inspection 812 from external sources (e.g., users via untrusted network 802) is directed to a web server (e.g., 820) managing the service, where web server 820 is associated with app server 830 and DB server 840. The external sources do not have access and typically do not communicate directly with app server 830 and DB server 840.

In one embodiment, control inspection 814 provides security services for all or portions of the control plane of the virtual network environment of the web servers, app servers and DB servers. Control plane communications consists of communication resulting from providing security services to the administrators of the web servers or other server. In one embodiment, control inspection 814 allows an administrator to communicate with each server (e.g., 820-842). For example, control inspection 814 allows access via a VPN or other type of secure communication (e.g., SSH).

In one embodiment, while security service 810 monitors traffic on network connections 850 and 956, security service 810 may not be able to monitor network traffic on network connections between the internal servers, e.g., network connection 852 between web server 820 and app server 830, network connection 858 between DB server 840 and DB server 842, etc. For example, when service inspection 812 receives network traffic directed to web server 820, service inspection 812 inspects the network traffic prior to, or concurrently while, sending the network traffic across network connection 850 to web server 820. If web server 820 subsequently sends the network traffic to another internal server (e.g., app server 830, web server 822, etc.), security service 810 does not inspect this traffic.

In one embodiment, security service 810 monitors traffic between internal connections (such as traffic from one server type to another). For example, service inspection 812 is capable of monitoring traffic between webserver 820 and app server 830 as well as app server 830 and DB server 840. In one embodiment, such capability is provided based on the different hierarchy levels of the servers. In such an embodiment, security service 810 may not be able to monitor network traffic on network connections between servers of the same level of hierarchy (such as between web server 820 and web server 822 or between DB server 840 and DB server 842.

The inability to inspect traffic, and specifically to inspect traffic between servers of the same tier or between servers that do not communicate under normal operation represents a security risk. Detecting and inspecting such traffic is critical to detecting and mitigating the spread of malware from a compromised system to uncompromised systems. In some embodiments, this type of spread (sometimes referred to as lateral spread) is constrained if the attempt to compromise a peer server can be detected. Even when such a spread cannot be prevented, the detection of the attempt can be used to quarantine infected servers and further protect remaining servers.

Figure 9:
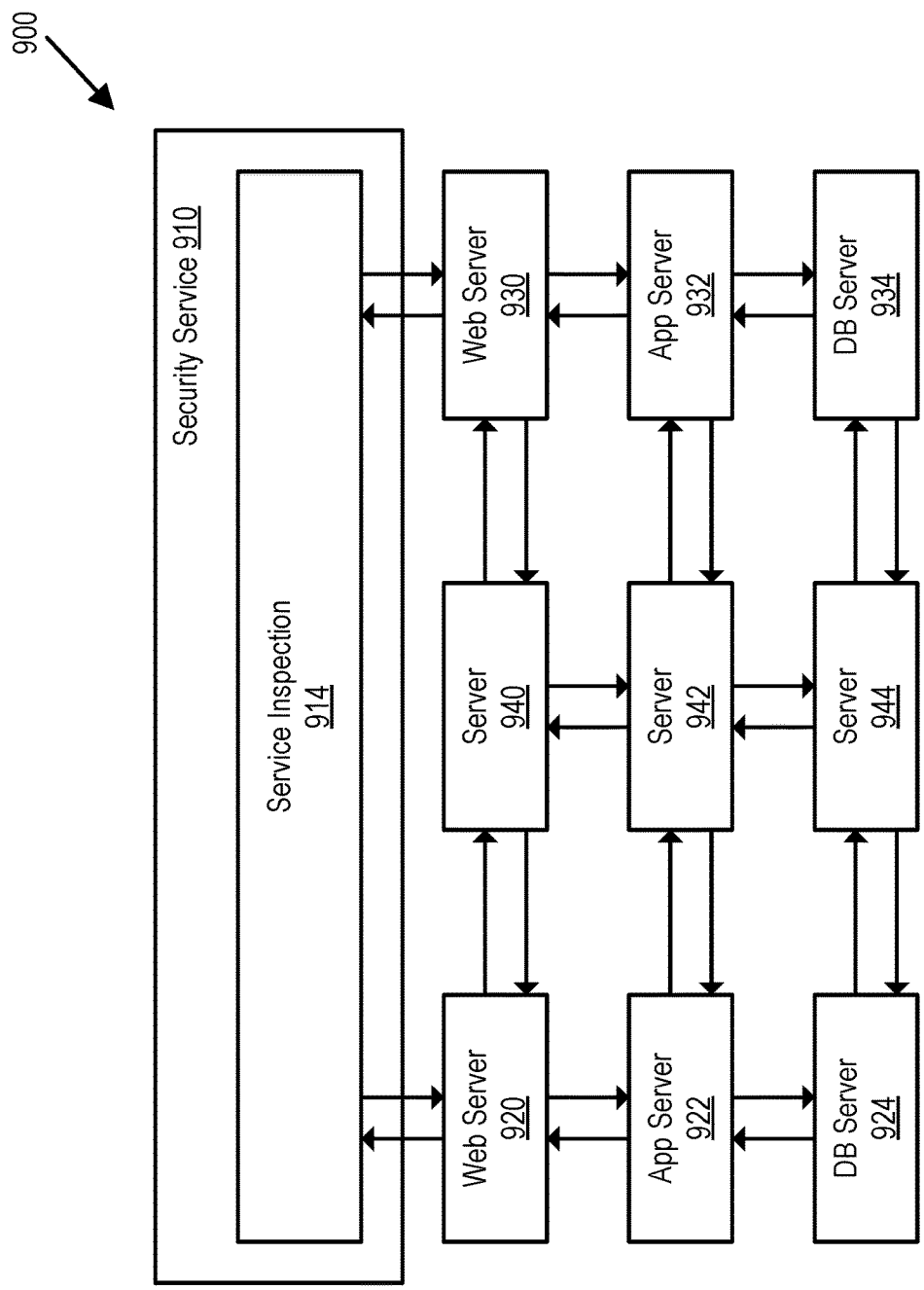
FIG. 9 is a block diagram illustrating an example system including a security service configured to manage communications between servers in accordance with the disclosed embodiments.

FIG. 9 is a block diagram illustrating an example system 900 including security service 910 configured to manage communications between servers in accordance with the disclosed embodiments. In one embodiment, security service 910 is an example of security service 124 in FIG. 1. In one embodiment, security service 910 operates as a firewall protecting servers (e.g., web server 920, 930, app server 922, 932, DB server 924, 934, and server 940-944). In the embodiment depicted in FIG. 9, service inspection 914 communicates directly with web servers 920, 930.

In one embodiment, a management microservice installs or deploys an interface microservice at servers having a connection with security service 910. As depicted in FIG. 9, the management microservice installs or deploys interface microservices at web server 920 and web server 930 because they have a direct connection with security service 910. Interface microservices may be deployed on the servers that provide the hypervisor or operating environment for the web, app and DB servers. Multiple interface microservices may be deployed depending on bandwidth requirements or network configuration considerations.

In one embodiment, security service 910 then instructs the deployed interface microservice to indicate which servers are in communication with the deployed interface microservices. Security service 910 maintains a database or list of servers (e.g., IP addresses of servers) that the server with the deployed interface microservice communicates with. In other embodiments, a management microservice maintains the database or list of servers.

Continuing the example above, security service 910 maintains a list of the servers that sends data to or receives data from web server 920 and web server 930. In FIG. 9, web server 920 communicates with app server 922 and server 940, while web server 930 communicates with app server 932 and server 940. Security service 910 adds app servers 922, 932 and server 940 to the list of servers. After security service 910 identifies the servers in communication with web servers 920, 930, security service 910 applies security policies to web servers 920, 930. In one embodiment, the security policy selected for application to web servers 920, 930 can be a default security policy, a security associated with a particular type of server, or a selection based on another type of criteria. Security service 910 then queries each additional server in the server list for any connected server. For example, security service 910 identifies connections between app server 922, and web server 920, DB server 924, and server 942. Security service 910 performs similar identifications for app server 932 and 940. Because security service 910 previously identified and applied a security policy to web server 920, security service 910 ignores web server 920, and security service 910 adds DB server 924 and server 942 to the server list. Security service continues this process until it identifies all servers and does not identify any new, previously unidentified connections.

Figure 10:
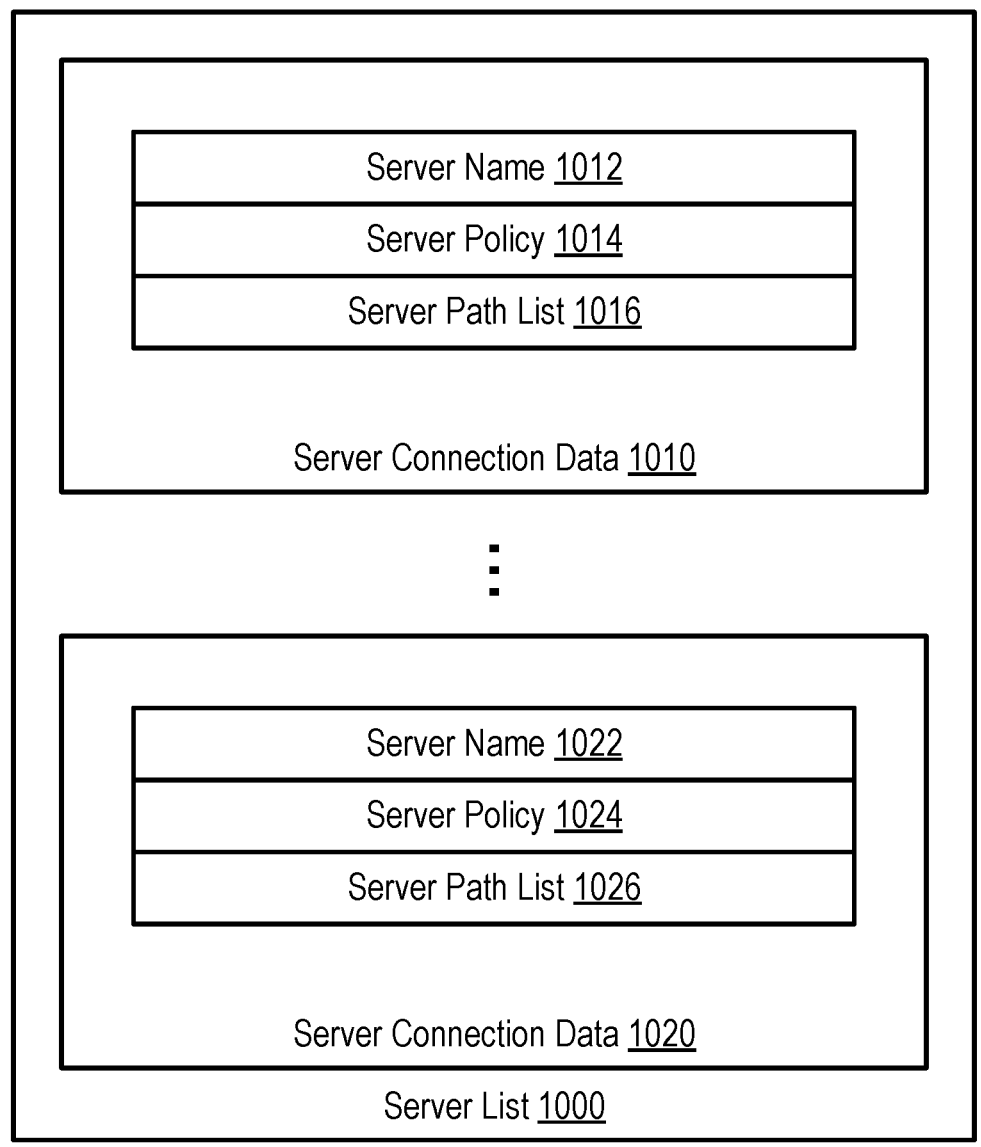
FIG. 10 is a block diagram illustrating a server list for storing server identification data in accordance with the disclosed embodiments.

FIG. 10 is a block diagram illustrating server list 1000 for storing server identification data in accordance with the disclosed embodiments. Server list 1000 includes a plurality of server connection data entries (e.g., 1010 and 1020), which security system 910 utilizes to store data for servers identified by the interface microservices. In one embodiment, server connection data entry 1010 includes server name 1012, server policy 1014, and server path list 1016, and server connection data entry 1020 includes server name 1022, server policy 1024, and server path list 1026. In one embodiment, server name 1012, 1022 stores an identifier for the server, server policy 1014, 1024 stores a security policy associated with the server, and server path list 1016, 1026 stores the list of connections to servers that the server is communicating.

In one embodiment, security service 910 applies a security policy to a server. In some embodiments, security service 910 indicates in server list 1000 that the server has been processed and a security policy has been applied. In one embodiment, each server connection data entry (e.g., 1010) includes an indicator flag indicating whether security service 910 has processed the corresponding server. In such embodiments, security service 910 performs the method described herein until there are no servers in the server list 1000 with the indicator indicating that the server has not been processed. In another embodiment, security service 910 maintains a list of servers for processing, separate from server list 1000, and security service 910 removes servers from the list of servers for processing after they are processed. In such embodiment, security service 910 performs the method described herein until no servers are in the separate list of servers for processing.

By iteratively traversing the identified servers to identify only those connections between servers that involve communication of data, the number of server and connections between servers being identified can be significantly reduced, reducing the amount of computing resources required to identify and apply security policies to active connections. Further, by using criteria to identify active communication paths or a subset of communications paths, rather than all possible communication paths, the iterative approach also quickly converges to a complete list of the communications paths (planned or unplanned) that are active in the deployed environment.

In some embodiments, security service 910 defines the connections to be identified. For example, security service 910 requests the identification of only a subset of the connections between servers. In one embodiment, the subset of the connections are determined based on the frequency of use of the connection, amount of time the connection is active, the amount of traffic transmitted across the connection, the type of data transmitted across the connection, etc. In some embodiments, security service 910 requests the identification of certain types of connections between servers. For example, security service 910 requests the identification of all encrypted connections or connections carrying encrypted traffic. In one embodiment, the connections to be identified are defined based on a combination of two or more of the criteria, including those described above.

Figure 11:
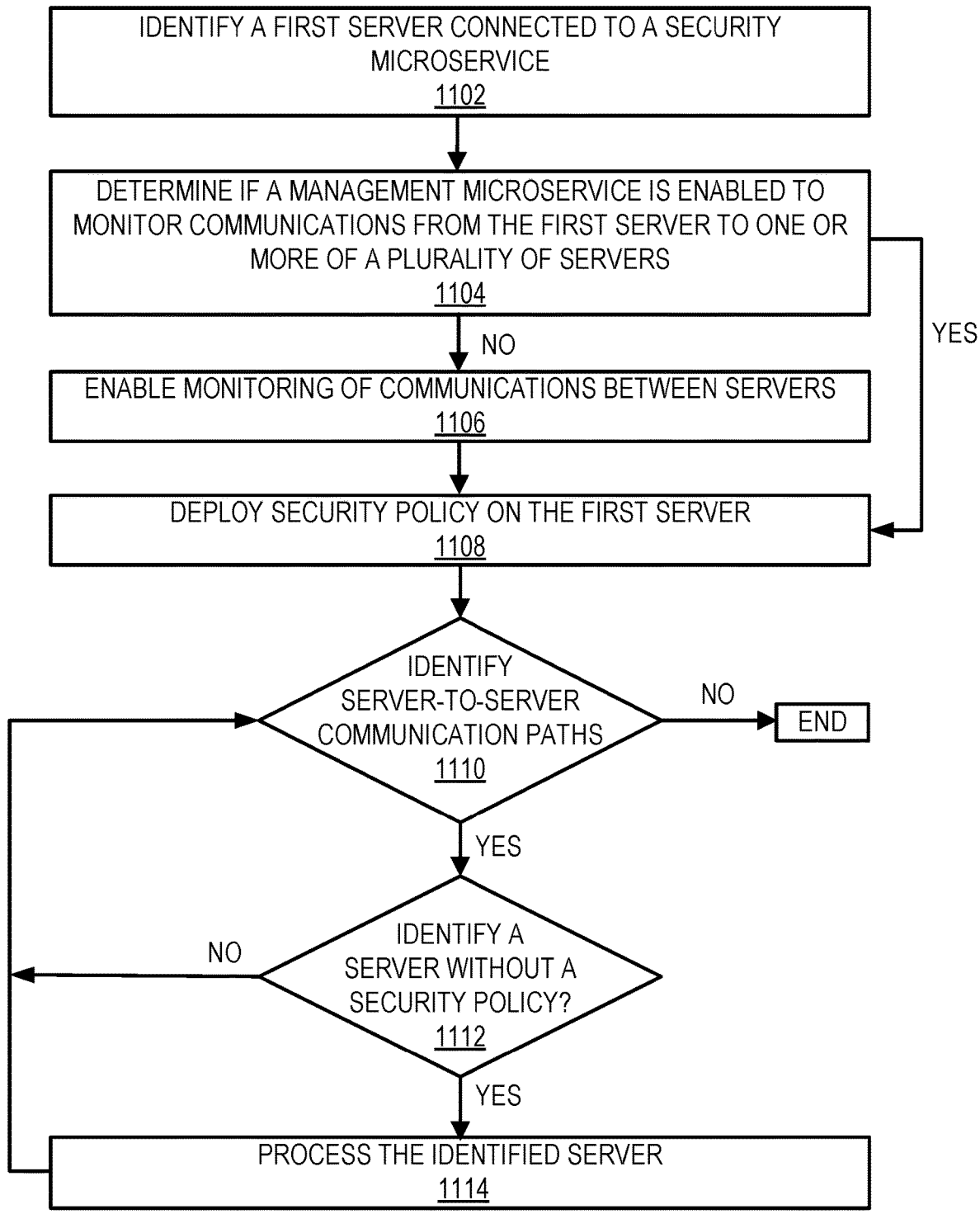
FIG. 11 is a flow diagram illustrating a process for determining a set of communication paths between servers in accordance with an embodiment.

FIG. 11 is a flow diagram illustrating a process for determining a set of communication paths between servers in accordance with an embodiment. For ease of understanding, the description of FIG. 11 below references components of the networked environments of FIGS. 1, 9, and 10, however, it is not limited to those components. In one embodiment, management microservice 910 receives instructions to perform the actions described below. Further, the actions below may be performed by one or more security microservices and/or one or more interface microservices at the direction of a management microservice. As such, a single security microservice may perform an action, or two more security services may perform the action either independently, or in conjunction. Although FIG. 11 describes operations performed by a management microservice (e.g., microservice 108-122), some or all of the operations described in FIG. 11 can be performed by a configuration microservice, an interface microservice, another type of microservice, an application, or any other computer-executable logic.

At block 1102, a management microservice identifies a first server connected to a security microservice, or another type of microservice (e.g., microservices 108-122 in FIG. 1). For example, the management microservice identifies that web server 920 is connected to security service 910.

At block 1104, the management microservice determines if the management microservice is enabled to monitor the network traffic and communications between the first server and one or more of a plurality of servers. For example, the management microservice determines if it is enabled to monitor the network traffic and communication paths from web server 920 to one or more of servers 922-944. In one embodiment, the management microservice is enabled to monitor the network traffic and communication between servers (e.g., servers 920-944) when an interface microservice is running on the server and the interface microservice running on the server has the bandwidth to handle the additional load. If the management microservice is not enabled to monitor the network traffic and communications between servers, the method proceeds to block 1106. In one embodiment, the management microservice is not enabled to monitor the network traffic and communications from a server when there are no interface microservices on the server, or existing interface microservices do not have sufficient bandwidth. When the management microservice is enabled to monitor the network traffic and communications between servers, the method proceeds to block 1108.

At block 1106, if management microservice is not enabled to monitor communications between servers, monitoring is enabled. In one embodiment, management microservice enables monitoring by deploying or initializing an interface microservice on the computing device. In one embodiment, the interface microservice is deployed on the computing device as shown in FIG. 7.

Using the example illustrated in FIG. 9, the management microservice deploys or initializes an interface microservice on web server 920, which has a communication path or connection with security service 910. In one embodiment, the management microservice accesses server list 1000 to determine if a server connection data entry is located in server list 1000. When management microservice determines that there is no entry for web server 920, the management microservice generates an entry for web server 920. For example, the management microservice generates server connection data entry 1010 for web server 920. Management microservice performs a similar process with respect to web server 930. For example, management microservice generates server connection data entry 1020 for web server 930.

At block 1108, the management microservice deploys a security policy on the connected first server. Continuing the example above, the management microservice, having identified web server 920, deploys a security policy on web server 920. In one embodiment, the management microservice applies a default security policy, a security associated with the particular type or class of server identified, or a security policy selected based on another type of criteria. In one embodiment, the management microservice creates a server connection data entry (e.g., 1010) in server list 1000 for web server 920 that includes the server name or identifier associated with web server 920 and the security policy applied to web server 920 in server name 1012 and server policy 1014, respectively. Management microservice performs the same process for web server 930 by deploying a security policy to web server 930 (e.g., if web server 930 does not have a security policy), and includes the security policy applied to web server 930 in a separate server connection data entry (e.g., security policy 1024 in server connection data entry 1020).

At block 1110, the management microservice identifies the server-to-server communications paths. When management microservices identifies server-to-server-communication paths, management microservice accesses server list 1000, identifies the corresponding server connection data entry, and modifies the server connection data entry with the identified server-to-server communication paths. In one embodiment, the server connection data entries are generated after the server-to-server communication paths are identified. Continuing the example, for web server 920, server path list 1016 is modified to include the communication path from web server 920 to app server 922 and the communication path from web server 920 to server 940. When the management microservice completes the process for the first server, the management microservice then identifies server-to-server communication paths for the next server in server list 1000. Similarly, for web server 930, server path list 1026 is modified to include the communication path from web server 930 to app server 932 and the communication path from web server 930 to server 940.

In one embodiment, if the management microservice is unable to identify any additional server-to-server communication paths, and all servers in server list 1000 have been processed (e.g., all servers in server list 1000 have an indicator indicating they have been processed), the method ends. Otherwise, if the management microservice identifies additional server-to-server communication paths or servers in server list 1000 to be processed (e.g., one or more servers in server list 1000 have an indicator indicating they have not been processed), the method proceeds to block 1112.

At block 1112, the management microservice identifies whether the identified server-to-server communication paths include any servers without a security policy. If management microservice determines that there are one or more servers without a security policy, the process proceeds to block 1114. If management microservice determines that there are either no severs without a security policy, or that no new servers were identified from any identified server-to-server communication paths, the process returns to block 1110 to identify server-to-server communication paths for any additional servers.

At block 1114, the management microservice processes the identified server in response to identifying one or more servers without a security policy. In one embodiment, management microservice applies a security policy to the one or more identified servers. In one embodiment, processing the identified server further comprises determining whether an interface microservice is initialized on the identified server. In such embodiments, the management microservice either initializes a new interface microservice on the server when there is not an existing interface microservice or when existing interface microservices are unable to handle additional loads. After the management microservice processes the identified server, the process returns to block 1108 to identify additional server-to-server communication paths.

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 12:
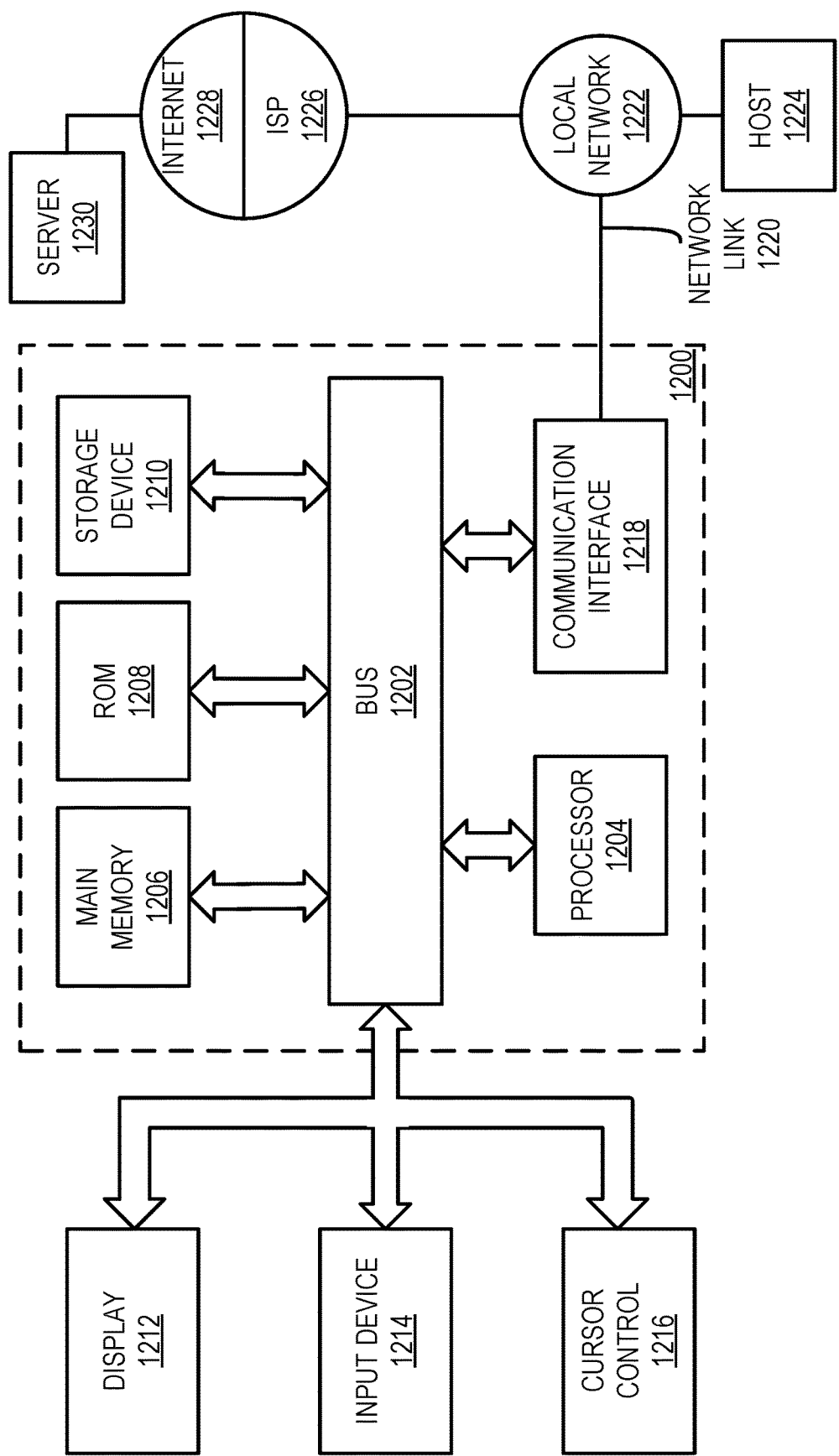
FIG. 12 is a block diagram that illustrates a computer system utilized in implementing the above-described techniques in accordance with some of the disclosed embodiments.

FIG. 12 is a block diagram that illustrates a computer system 1200 utilized in implementing the above-described techniques in accordance with some of the disclosed embodiments. Computer system 1200 may be, for example, a desktop computing device, laptop computing device, tablet, smartphone, server appliance, computing mainframe, multimedia device, handheld device, networking apparatus, or any other suitable device.

Computer system 1200 includes one or more buses 1202 or other communication mechanism for communicating information, and one or more hardware processors 1204 coupled with buses 1202 for processing information. Hardware processors 1204 may be, for example, general purpose microprocessors. Buses 1202 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1200 also includes a main memory 1206, such as a random access memory (RAM) or other dynamic or volatile storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 a special-purpose machine that is customized to perform the operations specified in the instructions.

Computer system 1200 further includes one or more read only memories (ROM) 1208 or other static storage devices coupled to bus 1202 for storing static information and instructions for processor 1204. One or more storage devices 1210, such as a solid-state drive (SSD), magnetic disk, optical disk, or other suitable non-volatile storage device, is provided and coupled to bus 1202 for storing information and instructions.

Computer system 1200 may be coupled via bus 1202 to one or more displays 1212 for presenting information to a computer user. For instance, computer system 1200 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1212 may include, without limitation, plasma display devices, projectors, cathode ray tube (CRT) monitors, electronic paper, virtual reality headsets, braille terminal, and/or any other suitable device for outputting information to a computer user. In one embodiment, any suitable type of output device, such as, for instance, an audio speaker or printer, may be utilized instead of a display 1212.

One or more input devices 1214 are coupled to bus 1202 for communicating information and command selections to processor 1204. One example of an input device 1214 is a keyboard, including alphanumeric and other keys. Another type of user input device 1214 is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Yet other examples of suitable input devices 1214 include a touch-screen panel affixed to a display 1212, cameras, microphones, accelerometers, motion detectors, and/or other sensors. In one embodiment, a network-based input device 1214 may be utilized. In such an embodiment, user input and/or other information or commands may be relayed via routers and/or switches on a Local Area Network (LAN) or other suitable shared network, or via a peer-to-peer network, from the input device 1214 to a network link 1220 on the computer system 1200.

A computer system 1200 may implement techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1200 can receive the data on the network and demodulate the signal to decode the transmitted instructions. Appropriate circuitry can then place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

A computer system 1200 may also include, In one embodiment, one or more communication interfaces 1218 coupled to bus 1202. A communication interface 1218 provides a data communication coupling, typically two-way, to a network link 1220 that is connected to a local network 1222. For example, a communication interface 1218 may be an integrated services digital network (ISDN) card, cable modem, satellite modem, or a modem to provide a data communication connection to a corresponding type of telephone line. As another example, the one or more communication interfaces 1218 may include a local area network (LAN) card to provide a data communication connection to a compatible LAN. As yet another example, the one or more communication interfaces 1218 may include a wireless network interface controller, such as an 802.11-based controller, Bluetooth controller, Long Term Evolution (LTE) modem, and/or other types of wireless interfaces. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by a Service Provider 1226. Service Provider 1226, which may for example be an Internet Service Provider (ISP), in turn provides data communication services through a wide area network, such as the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

In one embodiment, computer system 1200 can send messages and receive data, including program code and/or other types of instructions, through the network(s), network link 1220, and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution. As another example, information received via a network link 1220 may be interpreted and/or processed by a software component of the computer system 1200, such as a web browser, application, or server, which in turn issues instructions based thereon to a processor 1204, possibly via an operating system and/or other intermediate layers of software components.

In one embodiment, some or all of the systems described herein may be or comprise server computer systems, including one or more computer systems 1200 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In one embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In one embodiment, the cloud-based components may be implemented by third-party entities, on behalf of another entity for whom the components are deployed. In other embodiments, however, the described systems may be implemented entirely by computer systems owned and operated by a single entity.

In one embodiment, an apparatus comprises a processor and is configured to perform any of the foregoing methods. In one embodiment, a non-transitory computer-readable storage medium, storing software instructions, which when executed by one or more processors cause performance of any of the foregoing methods.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Examples of embodiments of methods, apparatuses, systems, etc. detailed herein are listed below.

In some embodiments, a computer-implemented method comprises: a management microservice identifying a first server connected to a security microservice managed by the management microservice. The method further comprises deploying a security policy on the first server, identifying server-to-server communication paths between the first server and one or more of a plurality of servers, and identifying servers without a security policy from the identified server-to-server communication paths. The method further comprises processing each identified server without the security policy.

In some embodiments, one or more of the following applies: 1) the security microservice is prevented from receiving the network traffic prior to enabling the data channel interface for the security microservice; 2) the method further comprises: determining whether an interface microservice is running on the computing device, and deploying the interface microservice on the computing device when the interface microservice is not running on the computing device; 3) the network traffic is received at the enabled data channel interface of the security microservice from one of the interface microservice and one of the plurality of security microservices; 4) the management network interface operates in a control plane, and wherein the data channel interface operates in a data plane; and 5) the method further comprises: receiving a security policy to apply to the network traffic via one or more interfaces.

In some embodiments, one or more non-transitory computer-readable storage media store instructions which, when executed by one or more hardware processors, cause performance of a method comprising: a management microservice identifying a first server connected to a security microservice managed by the management microservice. The method further comprises deploying a security policy on the first server, identifying server-to-server communication paths between the first server and one or more of a plurality of servers, and identifying servers without a security policy from the identified server-to-server communication paths. The method further comprises processing each identified server without the security policy In some embodiments, one or more of the following applies: 1) the security microservice is prevented from receiving the network traffic prior to enabling the data channel interface for the security microservice; 2) the method further comprises: determining whether an interface microservice is running on the computing device, and deploying the interface microservice on the computing device when the interface microservice is not running on the computing device; 3) the network traffic is received at the enabled data channel interface of the security microservice from one of the interface microservice and one of the plurality of security microservices; 4) the management network interface operates in a control plane, and wherein the data channel interface operates in a data plane; and 5) the method further comprises: receiving a security policy to apply to the network traffic via one or more interfaces.

In some embodiments, an apparatus comprises: one or more hardware processors; and memory coupled to the one or more hardware processors, the memory storing instructions which, when executed by the one or more hardware processors, cause the apparatus to: identify a first server connected to a security microservice managed by the management microservice. The instructions further cause the apparatus to deploy a security policy on the first server, identify server-to-server communication paths between the first server and one or more of a plurality of servers, and identify servers without a security policy from the identified server-to-server communication paths. The instructions further cause the apparatus to process each identified server without the security policy.

In some embodiments, one or more of the following applies: 1) the security microservice is prevented from receiving the network traffic prior to enabling the data channel interface for the security microservice; 2) the instructions further cause the apparatus to determine whether an interface microservice is running on the computing device, and deploying the interface microservice on the computing device when the interface microservice is not running on the computing device; 3) the network traffic is received at the enabled data channel interface of the security microservice from one of the interface microservice and one of the plurality of security microservices; 4) the management network interface operates in a control plane, and wherein the data channel interface operates in a data plane; and 5) the instructions further cause the apparatus to receive a security policy to apply to the network traffic via one or more interfaces.

What is claimed is:

1. A computer-implemented method comprising:
identifying, by a management microservice, a first server connected to a security microservice managed by the management microservice;
deploying a first security policy on the first server;
identifying server-to-server communication paths between the first server and one or more of a plurality of servers;
determining a subset of the identified server-to-server communication paths from the first server based on one or more criteria of the identified server-to-server communication paths, wherein the one or more criteria of the identified server-to-server communication paths includes frequency of use of the identified server-to-server communication paths, amount of time the identified server-to-server communication paths are active, an amount of traffic transmitted across the identified server-to-server communication paths, and a type of data transmitted across the identified server-to-server communication paths;

identifying servers without a security policy from the subset of the identified server-to-server communication paths; and for each identified server without the security policy, processing the identified server.

2. The computer-implemented method of claim 1, wherein processing the identified server comprises:

deploying a second security policy to the identified server.

3. The computer-implemented method of claim 2, wherein the deployed first security policy is determined based on a server type of the identified server.

4. The computer-implemented method of claim 1, further comprising:

determining the management microservice is not enabled to monitor communications from the first server to the one or more of the plurality of servers; and enabling monitoring of communications between the first server and the one or more of the plurality of servers.

5. The computer-implemented method of claim 4, wherein the enabling of the monitoring of the communications between the first server and the one or more of the plurality of servers comprises:

deploying an interface microservice on the first server.

6. One or more non-transitory computer-readable storage media storing instructions which, when executed by one or more hardware processors, cause performance of a method comprising:

identifying, by a management microservice, a first server connected to a security microservice managed by the management microservice;

deploying a first security policy on the first server;

identifying server-to-server communication paths between the first server and one or more of a plurality of servers;

determining a subset of the identified server-to-server communication paths from the first server based on one or more criteria of the identified server-to-server communication paths, wherein the one or more criteria of the identified server-to-server communication paths includes frequency of use of the identified server-to-server communication paths, amount of time the identified server-to-server communication paths are active, an amount of traffic transmitted across the identified server-to-server communication paths, and a type of data transmitted across the identified server-to-server communication paths;

identifying servers without a security policy from the subset of the identified server-to-server communication paths; and for each identified server without the security policy, processing the identified server.

7. The one or more non-transitory computer-readable storage media of claim 6, wherein processing the identified server comprises:

deploying a second security policy to the identified server.

8. The one or more non-transitory computer-readable storage media of claim 7, wherein the deployed first security policy is determined based on a server type of the identified server.

9. The one or more non-transitory computer-readable storage media of claim 6, further comprising:

determining the management microservice is not enabled to monitor communications from the first server to the one or more of the plurality of servers; and enabling monitoring of communications between the first server and the one or more of the plurality of servers.

10. The one or more non-transitory computer-readable storage media of claim 9, wherein the enabling of the monitoring of the communications between the first server and the one or more of the plurality of servers comprises:

deploying an interface microservice on the first server.

11. An apparatus comprising:

one or more hardware processors;

memory coupled to the one or more hardware processors, the memory storing instructions which, when executed by the one or more hardware processors, causes the apparatus to identify, by a management microservice, a first server connected to a security microservice managed by the management microservice;

deploy a first security policy on the first server;

identify server-to-server communication paths between the first server and one or more of a plurality of servers;

determine a subset of the identified server-to-server communication paths from the first server based on one or more criteria of the identified server-to-server communication paths, wherein the one or more criteria of the identified server-to-server communication paths includes frequency of use of the identified server-to-server communication paths, amount of time the identified server-to-server communication paths are active, an amount of traffic transmitted across the identified server-to-server communication paths, and a type of data transmitted across the identified server-to-server communication paths;

identify servers without a security policy from the subset of the identified server-to-server communication paths; and for each identified server without the security policy, process the identified server.

12. The apparatus of claim 11, wherein processing the identified server comprises:

deploying a second security policy to the identified server.

13. The apparatus of claim 12, wherein the deployed first security policy is determined based on a server type of the identified server.

14. The apparatus of claim 11, wherein the instructions further cause the apparatus to:

determine the management microservice is not enabled to monitor communications from the first server to the one or more of the plurality of servers; and enable monitoring of communications between the first server and the one or more of the plurality of servers.

15. The apparatus of claim 14, wherein the enabling of the monitoring of the communications between the first server and the one or more of the plurality of servers comprises:

deploying an interface microservice on the first server.

* * * * *